July 10, 1945.  B. WILLNER  2,380,353
DEFROSTING DEVICE FOR GOGGLES
Filed May 25, 1944  2 Sheets-Sheet 1
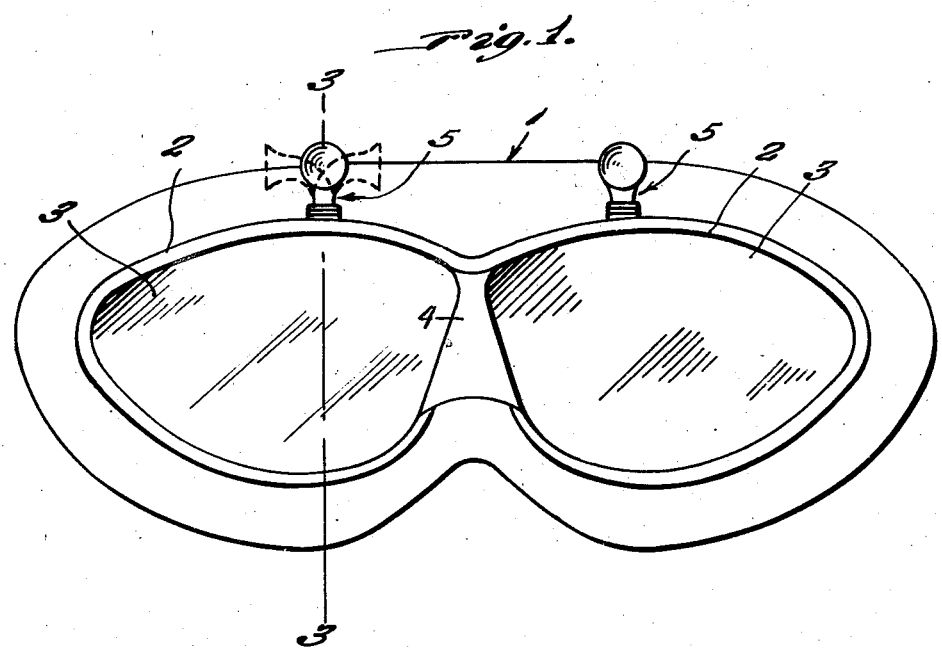
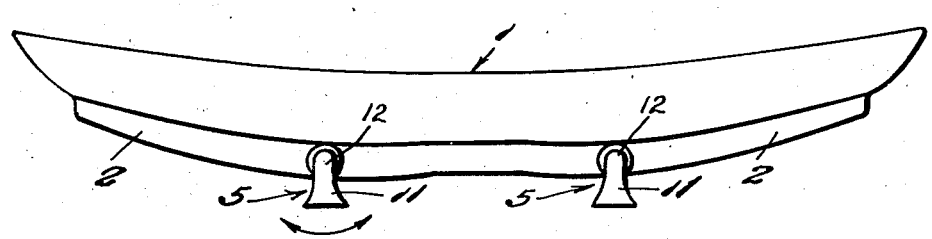
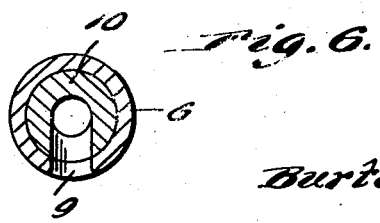
Inventor
Burton Willner
By Clarence A. O'Brien
and Harvey B. Jacobson
Attorneys July 10, 1945.  B. WILLNER  2,380,353
DEFROSTING DEVICE FOR GOGGLES
Filed May 25, 1944
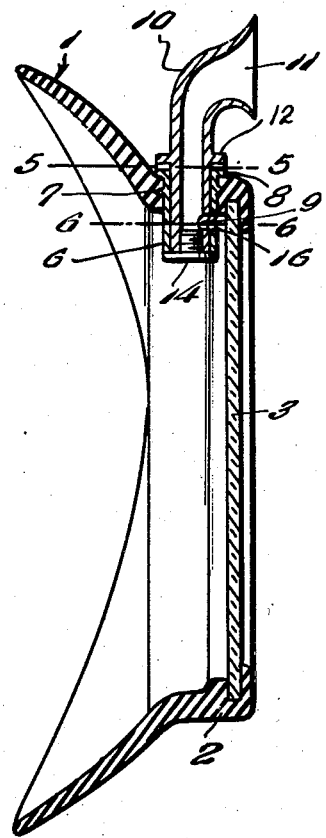
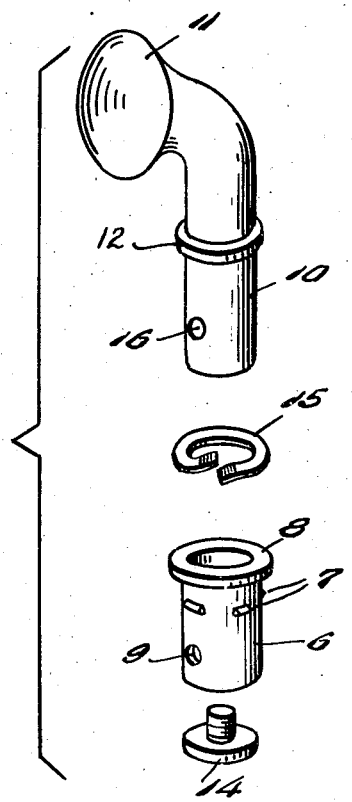
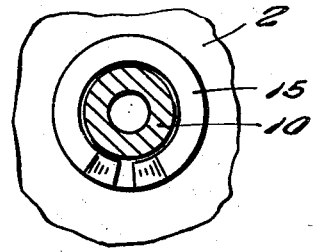
Inventor
Burton Willner
By Clarence A. O'Brien
and Harvey B. Jacobson
Attorneys Patented July 10, 1945

2,380,353

UNITED STATES PATENT OFFICE 2,380,353

DEFROSTING DEVICE FOR GOGGLES

Burton Willner, Chicago, Ill.

Application May 25, 1944, Serial No. 537,283

1 Claim. (Cl. 2—14)

My invention relates to improvements in goggles, and specifically to defrosting devices therefor.

As explanatory, aviators' goggles, particularly when worn in open-type planes, frequently become frosted, or clouded, on the inner sides of the lenses from warm air from the face and nose finding its way up behind the lenses, and also from other causes. The disadvantages arising because of such a condition of the lenses will be manifest.

With the foregoing in mind, the primary object of my invention is to provide for inexpensively equipping aviators' goggles, particularly those of commerce, with simply constructed means for defrosting, or clearing, the lenses at will, and which may be rendered ineffective so as to obviate injury to the eyes, or effective as regards either or both lenses, as occasion may arise.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in front elevation of a pair of goggles equipped according to my invention, Figure 2 is a view in top plan, Figure 3 is a view in vertical section taken on the line 3—3 of Figure 1, Figure 4 is a disassembled view of the parts of one of the air valves, Figure 5 is a view in horizontal section taken on the line 5—5 of Figure 3 and drawn to an enlarged scale, Figure 6 is a similar view taken on line 6—6 of Figure 3.

Referring to the drawings by numerals, my invention has been shown therein as applied to the usual goggles 1, of commerce, embodying the well known pair of eye cups 2 in which the lenses 3 are mounted and which are connected by the nose bridge 4.

According to my invention, each eye cup 2 has extended downwardly through the top portion thereof, immediately behind the lens 3, an air inlet valve 5 comprising a tubular outer sleeve 6 having an upper end suitably anchored in the cup 2, as by exterior, circumferentially spaced, anchoring lugs 7 embedded in the material of said cup, the sleeve 6 being further fixed to said cup by an upper edge, circumferential flange 8 secured to the top of the cup 2 in any suitable manner. The sleeve 6 depends into the cup 2 for a suitable distance to dispose a front air inlet port 9, provided therein adjacent its lower end, just clear of the inner rim of the cup 2, the port 9 opening directly onto the upper edge portion of the lens 3.

A tubular core 10, relatively longer than the sleeve 6, and having a laterally extending, funnel-shaped upper end 11, and a circumferential flange 12 intermediate its ends, is fitted below said flange 12 into said sleeve 6 with its lower end flush with the lower end of said sleeve and its funnel-shaped end 11 disposed above the cup 2. A headed screw plug 14 threaded into the lower end of the core 10 prevents the core from being withdrawn out of said sleeve 6. A resilient, split lock washer 15 interposed between the flanges 8 and 12 frictionally locks the core 10 against rotation in the sleeve 6. A side port 16 in the lower end portion of the core 10 is provided on the same side thereof as that to which the funnel-shaped end 11 extends and for registration with the port 9 when the core is rotated so that the funnel-shaped end 11 points forwardly of the goggles.

The operation of my invention will be readily understood. With the cores 10 rotated in the sleeves 6 to dispose the funnel-shaped ends 11 so as to point forwardly of the goggles 1, said ends function as air scoops, whereby, when the goggles 1 are worn by an aviator in an open plane moving forwardly, air is forced down the cores 10 and out of the registering ports 16, 9 into the cups 2 to disperse fog or moisture which has gathered on the rear sides of the lenses 3. By rotating the cores 10, in slight degree, in either direction, the ports 16 may be moved out of registration with the ports 9 to close the valves and prevent air from passing into the cups, as occasion may require. The lock washers 15 coact with the flanges 8, 12 to frictionally lock the cores 10 in any position into which said cores have been rotated. The described valves 5 may be formed of any inexpensive material, and are adapted to be applied to the goggles 1 easily and quickly, as will be apparent.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a pair of goggles embodying an eye cup and a lens in said cup, an air valve including an outer sleeve extending into the top of said cup and anchored therein, said sleeve having an air discharge port therein opposite the upper portion of the lens, a tubular core fitted in said sleeve and provided above said cup with a laterally extending funnel-shaped end forming an air scoop, said core being rotatable in said sleeve into different positions to swing said scoop into and from forwardly pointing position, a port in said core registering with the first-mentioned port when said scoop is swung into forwardly pointing poistion, and means to frictionally lock said core in said different positions including a lock washer surrounding said core above the sleeve, and a flange on the core frictionally engaging said washer.

BURTON WILLNER.